(No Model.)

W. L. SANBORN.
MUSIC HOLDER AND TURNER.

No. 591,060. Patented Oct. 5, 1897.

WITNESSES:
C. Nordfors
C. Gerst

INVENTOR
Wallace L. Sanborn
BY
Edgar Tate & Co
ATTORNEYS.

THE NORRIS PETERS CO., PHOTO-LITHO., WASHINGTON, D. C.

UNITED STATES PATENT OFFICE.

WALLACE LYMAN SANBORN, OF ANTHONY, RHODE ISLAND.

MUSIC HOLDER AND TURNER.

SPECIFICATION forming part of Letters Patent No. 591,060, dated October 5, 1897.

Application filed May 19, 1897. Serial No. 637,144. (No model.)

*To all whom it may concern:*

Be it known that I, WALLACE LYMAN SANBORN, a citizen of the United States, residing at Anthony, in the county of Kent and State of Rhode Island, have invented certain new and useful Improvements in Music Holders and Turners, of which the following is a full and complete specification, such as will enable those skilled in the art to which it appertains to make and use the same.

This invention relates to music holders and turners; and the object thereof is to provide an improved device of this class by means of which sheet-music may be held and quickly and easily turned whenever desired.

The invention is fully disclosed in the following specification, of which the accompanying drawings form a part, in which—

Figure 1:
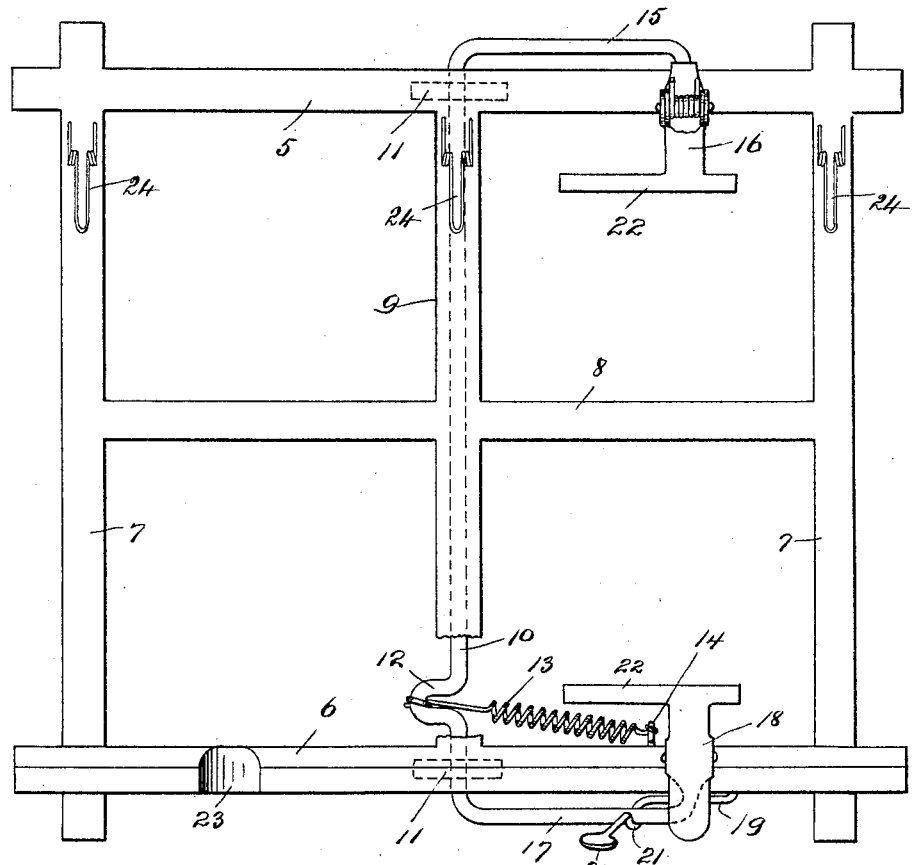
Figure 2:
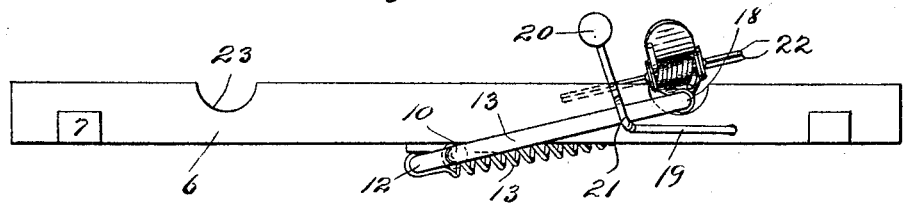
Figure 3:
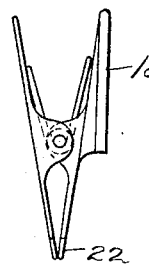

Figure 1 is a front view of my improved music holder and turner. Fig. 2 is a bottom plan view thereof, and Fig. 3 a side view of a detail of the construction.

In the drawings forming part of this specification the separate parts of my improvement are designated by the same numerals of reference in each of the views, and in the practice of my invention I provide a device for the purpose herein specified which consists of a rectangular frame composed of top and bottom bars 5 and 6, side bars 7, and central cross-bars 8 and 9, the cross-bar 9 being parallel with the side bars 7, and mounted beneath or back of the central cross-bar 9 is a shaft 10, which is supported by keepers 11, which are shown in dotted lines in Fig. 1 and which are secured to the top and bottom bars 5 and 6.

The shaft 10 is provided near the bottom bar 6 with a crank 12, with which is connected a spiral spring 13, one end of which is connected with the bottom bar 6, as shown at 14, and to the right of said shaft 10.

The shaft 10 is provided at its upper end with an arm 15, which projects at right angles thereto and with which is connected a downwardly-directed spring-clamp 16, and said shaft is provided at its lower end with an arm 17, which projects at right angles thereto and in line with the arm 15, and said arm is also provided with a spring-clamp 18, similar to that connected with the arm 15.

Secured to the bottom of the bottom bar 6 of the frame adjacent to the right-hand side thereof is a spring-arm 19, which is provided with a knob or handle 20 and a loop or yoke 21, and said loop or yoke 21 of the spring-arm 19 is adapted to engage with the arm 17 of the shaft 10, so as to hold said arm and said shaft in the position shown in Fig. 1, in which position the spring-clamps 16 and 18 are held at the right-hand side of the frame of the music holder and turner.

The spring-jaws of the spring-clamps 16 and 17 are each directed toward the central transverse rod or bar 8 of the frame, and each is provided with horizontal jaws 22, between which a sheet of music is adapted to be placed, and said spring-clamps may be made of any desired material and may be of any preferred construction, the only object in this connection being to provide a clamp which will grasp and hold the upper and lower edges of the sheet of music.

The sheet of music is placed between the jaws 22 of the spring-clamps 16 and 18, and whenever it is desired to turn the same the free end of the spring-arm 19 is depressed by pressing on the knob or handle 20 thereof, and the spring 13 will at once operate to turn the shaft 10 and the spring-clamps 16 and 18 and the sheet of music connected therewith.

The bottom cross-bar 6 of the main frame is provided at 23 with a transverse notch or recess which is adapted to receive the body portion of the clamp 18 when the shaft 10 is turned to the left, and said shaft 10 may be turned back to the position shown in Fig. 1 by taking hold of the arm 17 thereof, and secured to the front of the upper part of the main frame are downwardly-directed spring-clamps 24, which are intended to hold the outside sheets of music when several sheets are bound together, or to hold the cover of a music-book or of sheet-music.

This device is simple in construction and operation and is perfectly adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. A sheet-music holder and turner, consisting of a frame, a shaft mounted centrally of the back thereof, and provided at each end with arms which project in the same direction, a spring-clamp connected with each of said arms, and extending in the direction of the transverse center of the frame, said shaft being provided with a crank, and a spring which is secured thereto, and to the frame at the right of said shaft, and a spring-arm which is adapted to engage with the arm which is formed on or secured to the lower end of said shaft, substantially as shown and described.

2. A sheet-music holder and turner, consisting of a frame, a shaft mounted centrally of the back thereof, and provided at each end with arms which project in the same direction, a spring-clamp connected with each of said arms, and extending in the direction of the transverse center of the frame, said shaft being provided with a crank, and a spring which is secured thereto, and to the frame at the right of said shaft, and a spring-arm which is adapted to engage with the arm which is formed on or secured to the lower end of said shaft, said clamps being provided with jaws which are adapted to engage with and hold a sheet of music, substantially as shown and described.

In testimony that I claim the foregoing as my invention I have signed my name, in presence of the subscribing witnesses, this 4th day of May, 1897.

WALLACE LYMAN SANBORN.

Witnesses:
OLIVER W. BENNETT,
GEORGE A. BRIGGS.